United States Patent [19]

Deferme et al.

[11] Patent Number: 5,755,305

[45] Date of Patent: May 26, 1998

[54] HYDRAULIC VIBRATION DAMPER WITH NOISE REDUCING VALVE STRUCTURE

[75] Inventors: Stefan Leopold Jozef Deferme, Heusden-Zolder; Johan Luc Ceustermans, Tessenderlo, both of Belgium; Colin Peter Richardson, Selby, England

[73] Assignee: Monroe Auto Equipment Division of Tenneco Automotive Inc., Monroe, Mich.

[21] Appl. No.: 797,236

[22] Filed: Feb. 7, 1997

[51] Int. Cl.⁶ .......................... F16K 47/02; F16F 9/348
[52] U.S. Cl. .......................... 181/237; 181/233; 188/282
[58] Field of Search .......................... 181/226, 233, 181/234, 237; 188/282, 322.14, 322.15, 322.22; 251/118, 127; 137/625.3, 625.37

[56] References Cited

U.S. PATENT DOCUMENTS

| | | |
|---|---|---|
| 3,756,357 | 9/1973 | Graff et al. .......................... 188/282 |
| 3,920,044 | 11/1975 | Gruner . |
| 4,203,507 | 5/1980 | Tomita et al. .......................... 188/282 X |
| 4,397,331 | 8/1983 | Medlar . |
| 4,401,196 | 8/1983 | Grundei . |
| 4,512,548 | 4/1985 | Keller . |
| 4,549,718 | 10/1985 | Seger . |
| 4,617,963 | 10/1986 | Stares . |
| 4,650,155 | 3/1987 | Liantonio . |
| 4,679,592 | 7/1987 | Lamb . |
| 4,763,754 | 8/1988 | Coppolani et al. .......................... 181/237 |
| 4,860,993 | 8/1989 | Goode . |
| 4,895,342 | 1/1990 | Feild . |
| 5,018,703 | 5/1991 | Goode . |
| 5,020,571 | 6/1991 | Tartaglia et al. . |
| 5,275,541 | 1/1994 | Becker et al. . |

FOREIGN PATENT DOCUMENTS

| | | |
|---|---|---|
| 990615 | 6/1976 | Canada . |
| 0 442 582 A1 | 8/1991 | European Pat. Off. . |
| 2 561 742 | 9/1985 | France . |

*Primary Examiner*—Khanh Dang
*Attorney, Agent, or Firm*—Harness, Dickey & Pierce

[57] ABSTRACT

A hydraulic vibration damper includes a noise-reducing valve structure that isolates the region of cavitation away from the metal structures forming the pressure cylinder, the piston and valve structures. The improved design includes a sharper rebound land edge angle forming a boundary near the valve exit, enlarging the region of working fluid adjacent the valve structure exit within which implosions can take place. This design also dispenses with the use of a skirt around the perimeter of the piston, and removes contact between the piston and the pressure cylinder. A support piston provides contact with the interior surface of the pressure cylinder. These features distance the region of cavitation from metal surfaces of the piston and valve structures, thereby significantly reducing the transmission throughout the vibration damper of noise and vibration caused by implosions within the working fluid.

12 Claims, 2 Drawing Sheets

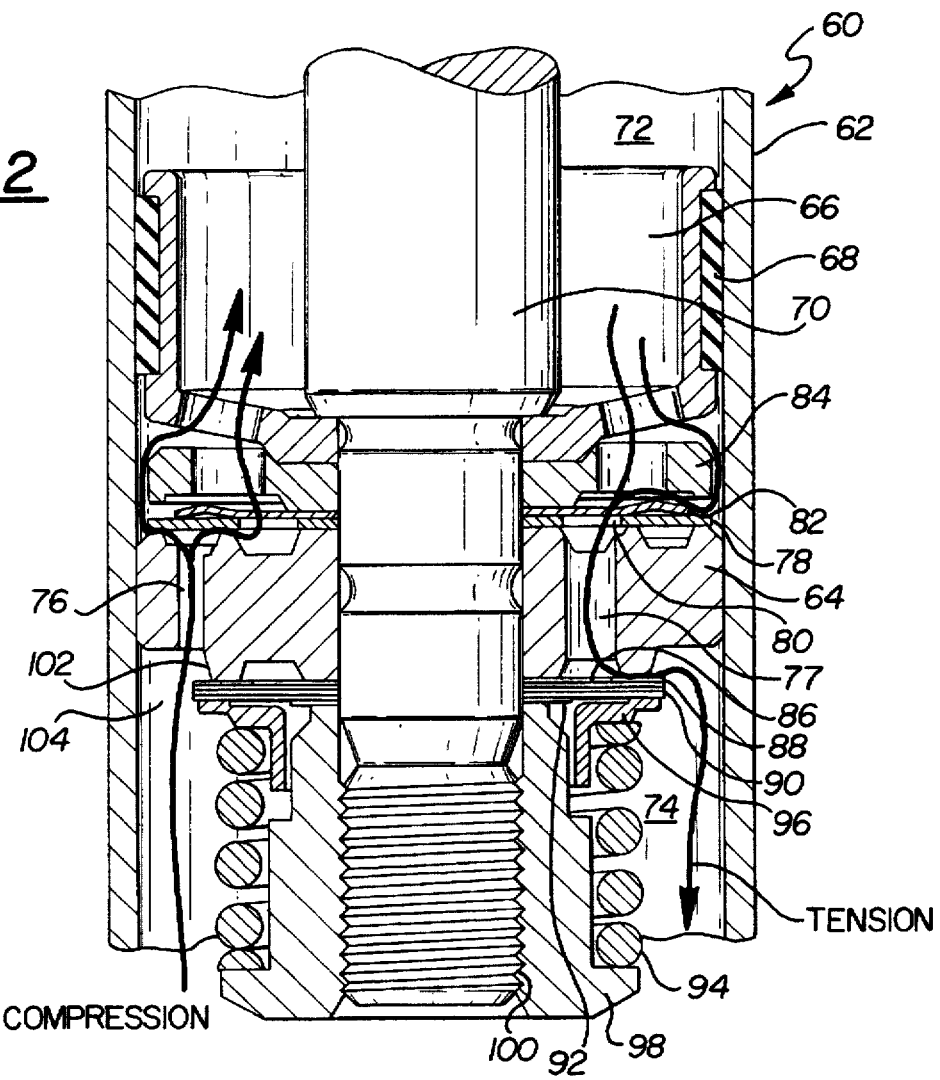

HYDRAULIC VIBRATION DAMPER WITH NOISE REDUCING VALVE STRUCTURE

TECHNICAL FIELD

The present invention relates generally to hydraulic vibration dampers, such as those of the type commonly used on automobiles. More particularly, the invention relates to a hydraulic vibration damper that includes a pressure cylinder containing a working fluid and a piston disposed upon a piston rod that divides the working space formed by the cylinder enclosure into two working spaces. A valve arrangement is associated with the piston to control the movement of the working fluid in each direction relative to the piston, thereby providing a damping function. The damper includes specialized rebound land and piston configurations for reducing noise and vibration associated with the flow of working fluid through the valves.

BACKGROUND OF THE INVENTION

Hydraulic vibration dampers are used in many types of mechanical equipment where it is desired to isolate noise and vibration between two adjacent portions of a mechanical assembly. A common usage of such hydraulic vibration dampers is the type commonly used on passenger automobiles. These dampers help to prevent the transmission of noise and vibration associated with the travel of the automobile tires over the ground to the vehicle body. Such vibration dampers typically include a pressure cylinder within which is located a moveable piston that divides the working space formed by the cylinder enclosure into two working spaces. A working fluid is moved between the two sides of the piston through a series of valves. The control of the working fluid movement between the two working spaces operates to dampen noise and vibration so that they are reduced in intensity and variation when transmitted to the automobile. The selective control of the working fluid achieves the desired characteristics for damping noise and vibration. Selective control of the working fluid movement can be accomplished through the characteristics of the valve components within the cylinder.

The piston within known vibration damper assemblies typically includes a cylindrical skirt at the piston perimeter. This skirt encloses a bearing band that provides a seal between the piston and the interior surface of the pressure cylinder. The valve structure of known vibration damper assemblies for tension operation typically includes a series of valve discs supporting an orifice disc that deflect under pressure to allow the passage of fluid through the valve. The rebound land is the portion of the lower surface of the piston located radially outwardly from the orifice disc, which is the first surface that the working fluid passes upon exiting the valve. In known applications, the rebound land is typically configured at an slope of approximately 45° relative to the surface of the orifice disc in an undeflected condition.

The movement of the working fluid between the working spaces of the vibration damper assembly is associated with movement of the piston in response to undulations in the ground surface over which the automobile wheels travel. The piston movement causes pressure increases and decreases in the working spaces, which in turn, causes working fluid movement from a working space of high pressure to another working space of low pressure. Regulation of the working fluid movement is accomplished in both directions between the working spaces of a vibration damper by the valves associated with bores disposed within the piston. This movement of working fluid includes movement from one relatively large volume of working space through regions of restriction associated with the much smaller volume valve structures, and again to the other working space, which is another region of relatively large volume. The working fluid, moving in response to increased pressure within one working space, moves through the valve structure and experiences a significant pressure decrease upon exiting the valve structure into the other working space.

When the travel of the working fluid from regions of high pressure to regions of low pressure is accompanied by such a significant pressure decrease in the working fluid upon exiting the valve structure that the pressure of the working fluid drops below vapor pressure, evaporation within the working fluid results in vapor bubbles at this location. Further travel of the working fluid beyond the point of low pressure, where pressure increases above vapor pressure, causes these vapor bubbles to collapse. This activity, commonly known in the field as cavitation or implosion, causes a transfer of forces within the working fluid that generates its own additional undesirable noise and vibration within the working fluid. The forces transmitted from the collapse of the vapor bubbles can cause damage to the internal components of a damping assembly, particularly at regions of the assembly proximate the location of lowest pressure. Noise and vibration associated with the collapse of these vapor bubbles is undesirable because it can be transmitted throughout the vibration damper structure and to the automobile body.

It is therefore advantageous to develop a valve structure for a vibration damper that minimizes the transfer of noise and vibrations associated with cavitation of the working fluid throughout the vibration damper and to the automobile body.

SUMMARY OF THE INVENTION

The above and other objects of the invention are met by the inventive vibration damper with noise-reducing valve structure which is disclosed and claimed herein. As part of the present invention, the inventors have determined that the occurrence of the vapor bubble implosions near or in contact with the metal structures forming the pressure cylinder, the piston and valve structures tends to cause greater transmission of noise and vibration generated by the implosions throughout the vibration damper. This noise and vibration is ultimately passed on to the automobile, if not reduced. The inventors have further determined that isolating the cavitation region within the working fluid away from these metal structures forming the pressure cylinder, the piston and valve structures reduces transmission of the generated noise and vibration throughout the vibration damper. In addition, the inventors have determined that providing improved working fluid support to the region of low pressure causes less evaporation within the working fluid.

The present invention therefore provides an improved design for a vibration damper that isolates the region of cavitation away from the metal structures forming the pressure cylinder, the piston and valve structures. The improved design includes a sharper rebound land edge angle forming a boundary near the valve exit. This configuration enlarges the region of working fluid adjacent the valve structure exit within which the implosions can take place, providing improved fluid support in the low pressure region proximate the valve exit, a reduction in the size of this low pressure region and a consequential reduction in working fluid evaporation beyond the valve exit. The improved valve design also dispenses with the use of a skirt around the perimeter of the piston, as well as the use of a bearing band upon this piston. This configuration removes contact between the piston and the pressure cylinder and additionally enlarges the region within the working fluid for cavitation. A support piston is also added to this design, thereby providing a bearing location required by the loss of contact between the piston and the interior surface of the pressure cylinder. The use of a support piston distances the region of cavitation from the PTFE-to-metal bearing contact with the interior surface of the pressure cylinder. The improved design significantly reduces the transmission throughout the vibration damper structure of noise and vibration caused by implosions within the working fluid, thereby significantly reducing the amount of this noise and vibration transmitted beyond the damper.

Accordingly, it is an object of the present invention to provide an improved hydraulic vibration damper piston and valve structure for reducing the transmission throughout the damper structure of noise and vibration caused by cavitation within the working fluid.

It is also an object of the present invention to provide the improved hydraulic vibration damper piston and valve structure described above that can be manufactured using present manufacturing techniques.

It is a further object of the present invention to provide the improved hydraulic vibration damper piston and valve structure described above that can be manufactured at a reasonable cost.

Additional objects, advantages and futures of the present invention will become apparent from the following description and appended claims, taken in conjunction with the accompanying drawings.

BRIEF DESCRIPTION OF THE DRAWINGS

Various advantages of the present invention will become apparent from the following specification and appended claims by reference to the following drawings in which:

FIG. 2 is a cross-sectional view illustrating the improved vibration damper structure according to the present invention; and FIG. 3 illustrates an enlarged cross-sectional view of a region of low pressure located within the improved vibration damper according to the present invention.

DETAILED DESCRIPTION OF THE PREFERRED EMBODIMENT

Figure 1:
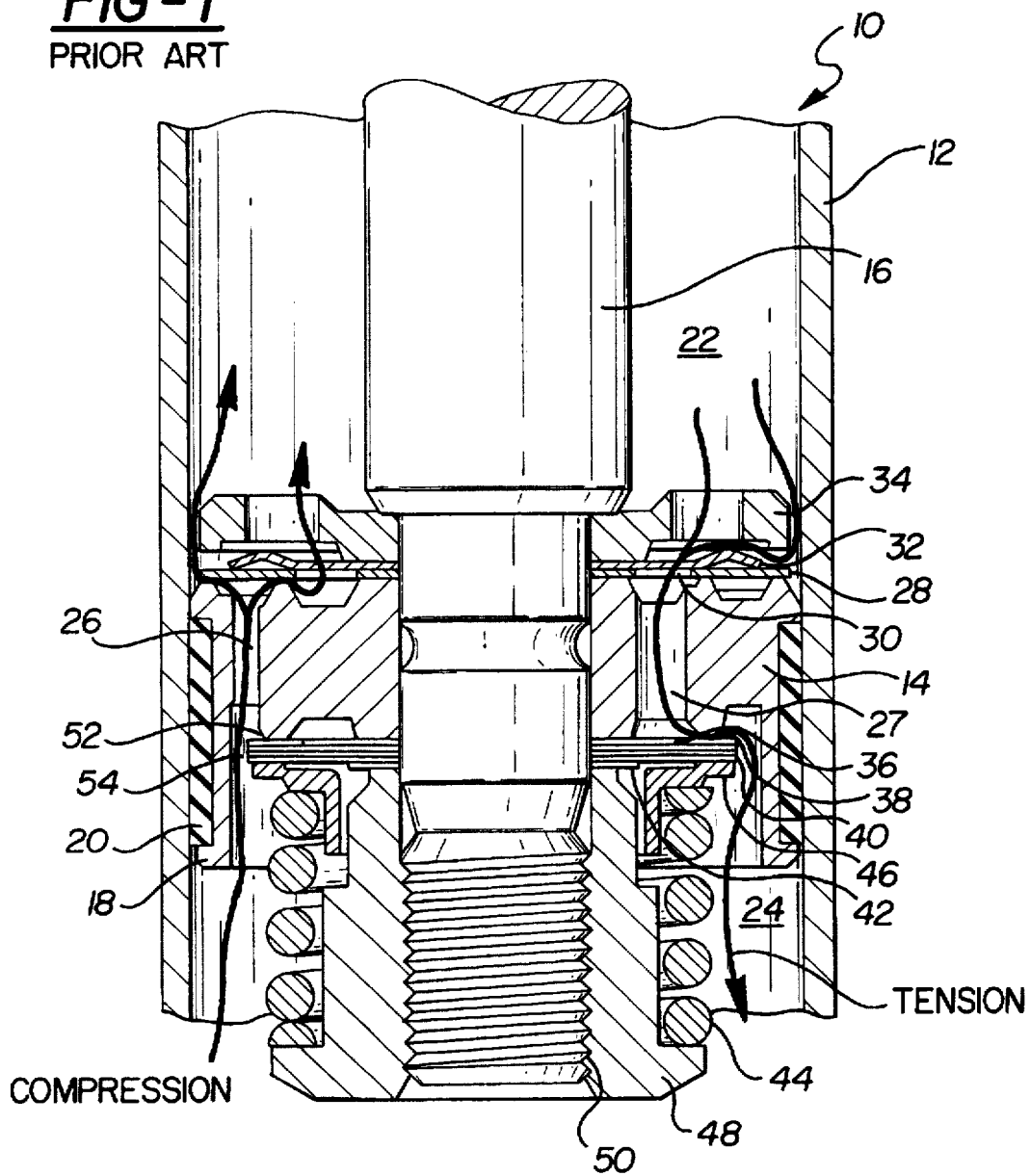
FIG. 1 is a cross-sectional view of a known double-tube hydraulic vibration damper structure.

It should be understood that while this invention is described in connection with particular examples, the scope of the invention need not be so limited. Rather, those skilled in the art will appreciate that the following teachings can be used in a much wider variety of applications than the examples specifically mentioned herein.

Referring now to FIG. 1, there is shown a cross-sectional view of a known double-tube hydraulic vibration damper, generally at 10. The vibration damper 10 is of the double-tube type used on passenger automobiles by being disposed in a customary manner between the wheels and the automobile frame. However, it will be appreciated that the principles demonstrated herein in connection with the vibration damper 10 may also apply to vibration dampers of other types and dampers for other uses besides automobiles. The vibration damper 10 includes a pressure cylinder 12, having a first end (not shown) and a second end (not shown). The interior of the vibration damper 10 defines a working cavity for containing a working fluid. A piston 14 is disposed for longitudinal movement within the pressure cylinder 12. A piston rod 16 is disposed upon the central longitudinal axis of the pressure cylinder 12 in communication with the piston 14, and is also disposed for longitudinal movement within the pressure cylinder 12. Thus, the piston rod 16 and piston 14 are moveable in an inward and an outward direction within the pressure cylinder 12. In the known design shown in FIG. 1, the piston 14 includes a cylindrical skirt 18 about its perimeter. The skirt 18 encloses a bearing 20 that provides a seal between the piston 14 and the interior surface of the pressure cylinder 12. Thus, in this known design, the interior of the pressure cylinder 12 is separated by the piston 14 and the bearing 20 into a working space 22 above the piston 14 and a working space 24 below the piston 14.

The working spaces 22 and 24 are filled with a working fluid, typically an oil operable for being displaced between regions of the vibration damper 10 under pressure. The working spaces 22 and 24 are in fluid communication with each other through a plurality of piston bores 26 and 27 disposed within the piston 14. The piston bores 26 allow the working fluid to travel from the working space 24 to the working space 22 under compression operation of the vibration damper 10. The piston bores 27 allow the working fluid to travel from the working space 22 to the working space 24 under tension operation of the vibration damper 10. Valve means are associated with both the piston bores 26 and 27. These components control the flow of working fluid in both directions between the working spaces 22 and 24, and are described in detail below.

The valve means associated with the travel of working fluid from the working space 24 to the working space 22 includes an intake valve disc 28 having a plurality of apertures 30. The intake valve disc 28 is biased against the piston 14 by an intake spring 32. Working fluid flows through the piston bores 26 and past the intake valve disc 28 during its travel from the working space 24 to the working space 22 by passing partially through the apertures 30 and partially around the intake valve disc 28. A support washer 34 is also disposed upon the piston rod 16 above the intake spring 32 for biasing the intake valve disc 28 and the intake spring 32 against the piston 14. When the piston 14 is moving in an inward direction during the compression phase of operation, the deflection of the intake spring 32 in response to increased pressure in the working space 24 allows working fluid to flow through the piston bores 26 and into the working space 22. When the piston 14 is substantially stationary or moving in an outward direction during the tension phase of operation, the intake spring 32 is operable to maintain the intake valve disc 28 in a closed condition, such that working fluid does not flow through the valve.

The valve means associated with regulating travel of the working fluid from the working space 22 to the working space 24 includes an annular orifice disc 36 having a plurality of orifices 38 for the passage of working fluid. A plurality of valve discs 40 and a torque washer 42 support the orifice disc 36, and are retained in place against the lower surface of the piston 14 by a rebound spring 44, which applies force to a spring seat 46 disposed beneath the valve discs 40 and torque washer 42. The rebound spring 44 is partially compressed against the spring seat 46 by a nut 48 threaded onto a threaded end 50 of the piston rod 16. Flow of the working fluid through the orifice disc 36 during its travel from the working space 22 to the working space 24 is therefore regulated through the orifices 38 by the valve discs 40 and the rebound spring 44. When the piston 14 is moving in an outward direction during the tension phase of operation, the deflection of the valve discs 40 in response to increased pressure in the working space 22 allows working fluid to flow through the orifices 38 and into the working space 24. When the piston 14 is substantially stationary or moving in an inward direction during the compression phase of operation, the rebound spring 44 is operable to maintain the valve discs 40 substantially against the orifice disc 36, closing the valve structure so that working fluid does not flow through the valve. The physical characteristics of the valve components described above determine the flow characteristics of fluid in both directions within the vibration damper 10, and thus determine the damping characteristics of the damper as a whole.

The lower surface of the piston 14 includes a specialized configuration for the exit of the working fluid from the orifice disc 36. This configuration includes a rebound land 52, which is an axially upwardly and radially outwardly sloping surface forming a portion of the lower surface of the piston 14. In the known configuration shown in FIG. 1, the rebound land 52 is configured at an angle in a radially outward and axially outward direction of approximately 45° relative to the surface of the orifice disc 36 in an undeflected condition. The flow of working fluid exiting this valve structure into the working space 24 is therefore in a substantially outward radial direction, due to the configuration of the adjacent lower surface of the piston 14, including the rebound land 52, the orifice disc 36 and the valve discs 40. It will be appreciated that in other valve configurations, different directions of working fluid flow exiting the valve structure will occur.

During compression operation of the vibration damper 10, the piston rod 16 moves in an downward direction within the pressure cylinder 12, accompanied by downward movement of the piston 14. This movement causes increased pressure of the working fluid within the working space 24 and a decrease in working fluid pressure within the working space 22 located above the piston 14. As a result of this pressure differential, damping fluid located within the working space 24 flows through the piston bores 26 and partially through the apertures 30 and partially via the outer diameter of the intake valve disc 28, upon deflection of the intake spring 32 by the pressure of the working fluid.

During tension operation of the vibration damper 10, the piston rod 16 moves in an upward direction within the pressure cylinder 12, accompanied by upward movement of the piston 14. This movement causes increased pressure of the working fluid within the working space 22 and a decrease in working fluid pressure within the working space 24 located below the piston 14. As a result of this pressure differential, damping fluid located within the working space 22 flows through the apertures 30 in the intake valve disc 28, through the piston bores 27 and past the rebound land 52. Upon arriving in the region of the working space 24 adjacent the rebound land 52 and the skirt 18 of the piston 14, the working fluid passing through the orifice disc 36 experiences the significant pressure drop, followed by a pressure increase as described above. This causes the formation of vapor bubbles within the working fluid which subsequently collapse in the region labelled in FIG. 1 as the implosion region 54.

Due to the contact between the bearing 20 and the pressure cylinder 12, as well as the confined area proximate the skirt 18 of the piston 14 and the rebound land 52, the implosions within the working fluid occur near a significant amount of the metal components making up the lower surface of the piston 14 and valve assembly. Thus, noise and vibration from the implosions within the working fluid are undesirably transmitted through these adjacent structures, and are distributed throughout the vibration damper 10. This can result in undesirable noise emanating from the vibration damper 10, as well as the transmission of vibration from the vibration damper 10 to the automobile.

Referring now to FIG. 2, there is shown a vibration damper 60 according to the present invention. As before, the vibration damper 60 is shown to be of the double-tube type used on passenger automobiles by being disposed in a customary manner between the wheels and the automobile frame. However, it will be appreciated that the principles demonstrated herein in connection with the vibration damper 60 according to the present invention may also apply to vibration dampers of other types and dampers for other uses besides automobiles. The vibration damper 60 is shown to include a pressure cylinder 62, having a first end (not shown) and a second end (not shown). The interior of the vibration damper 60 defines a working cavity for containing a working fluid, in similar configuration as before. The vibration damper 60 also includes a piston 64, disposed for longitudinal movement within the pressure cylinder 62. In this improved arrangement, however, the piston 64 does not perform the bearing function, as did the piston 14 in the vibration damper 10 of known design. The vibration damper 60 of the present invention includes a support piston 66 and an associated bearing 68 for performing the bearing function previously performed by the single piston 14 and its associated bearing 20 in the previously-described design. In this arrangement, the piston 64 does not include a skirt, such as that shown at 18 in FIG. 1. A skirt is not required in this design because the main bearing function is performed by the support piston 66.

The piston 64 and the support piston 66 are located upon a piston rod 70 that is disposed upon the central longitudinal axis of the pressure cylinder 62, in similar manner as before. Thus, in this arrangement, the piston 64, support piston 66 and the piston rod 70 are all disposed for longitudinal movement in an inward and an outward direction within the pressure cylinder 62. The support piston 66 is operable to separate the interior of the pressure cylinder 62 into a working space 72 above the support piston 66 and a working space 74 below the support piston 66. Both of the working spaces 72 and 74 are operable to contain a working fluid, typically an oil operable for being displaced between regions of the vibration damper 60 under pressure, in similar manner as before. The working spaces 72 and 74 are also disposed in fluid communication with each other in similar manner as before, through a plurality of piston bores 76 and 77 disposed within the piston 64. The piston bores 76 allow the working fluid to travel from the working space 74 to the working space 72 under compression operation of the vibration damper 60. The piston bores 77 allow the working fluid to travel from the working space 72 to the working space 74 under tension operation of the vibration damper 60. Valve means, similar to those described above in connection with FIG. 1, yet with certain improved features, are also associated with the piston bores 76 and 77 in the design of the present invention. These components control the flow of working fluid in both directions between the working spaces 72 and 74, and are described in detail below.

The valve means associated with regulating travel of the working fluid from the working space 74 to the working space 72 includes an intake valve disc 78 having an elongated aperture 80 of a generally curved configuration. Working fluid flows through the piston bores 76 and past the intake valve disc 78 during its travel from the working space 74 to the working space 72 by passing partially through the aperture 80 and partially around the intake valve disc 78. A support washer 84 is also disposed upon the piston rod 70 between the support piston 66 and the intake spring 82 for biasing the intake valve disc 78 and the intake spring 82 against the piston 64. The deflection of the intake spring 82 in response to increased pressure in the working space 74 allows working fluid to flow through the aperture 80 and into the working space 72. When the piston 64 is moving in an inward direction during the compression phase of operation, the deflection of the intake spring 82 in response to increased pressure in the working space 74 allows working fluid to flow through the aperture 80 and into the working space 72. When the piston 64 is substantially stationary or moving in an outward direction during the tension phase of operation, the intake spring 82 is operable to maintain the intake valve disc 78 in a closed condition, such that working fluid does not flow through the valve.

The valve means associated with regulating travel of the working fluid from the working space 72 to the working space 74 includes several components for regulating flow of the working fluid, in similar manner as before. An annular orifice disc 86 includes a plurality of orifices 88 for the passage of working fluid. A plurality of valve discs 90 and a torque washer 92 support the orifice disc 86, and are retained in place against the lower surface of the piston 64 by a rebound spring 94, which applies force to a spring seat 96 disposed beneath the valve discs 90 and torque washer 92. The rebound spring 94 is partially compressed against the spring seat 96 by a nut 98 threaded onto a threaded end 100 of the piston rod 70. Flow of the working fluid through the orifice disc 86 during its travel from the working space 72 to the working space 74 is regulated through the orifices 88 by the valve discs 90 and the rebound spring 94, in similar manner as before. When the piston 64 is moving in an outward direction during the tension phase of operation, the deflection of the valve discs 90 in response to increased pressure in the working space 72 allows working fluid to flow through the orifices 88 and into the working space 74. When the piston 64 is substantially stationary or moving in an inward direction during the compression phase of operation, the rebound spring 94 is operable to maintain the valve discs 90 substantially against the orifice disc 86, closing the valve structure so that working fluid does not flow through the valve. The physical characteristics of the valve components described above determine the flow characteristics of fluid in both directions within the vibration damper 60, and thus determine the damping characteristics of the damper as a whole.

Referring now to both FIGS. 2 and 3, the lower surface of the piston 64 also includes a rebound land at 102, which is an axially upwardly and radially outwardly sloping surface forming a portion of the lower surface of the piston 64, as with the known configuration shown in FIG. 1 previously. The implosion region located adjacent the rebound land 102 is identified in FIG. 2 at 104. Whereas, in the previous known configuration, the rebound land 52 is shown to be configured at a slope of approximately 45° relative to the surface of the orifice disc 36 in an undeflected condition the rebound land 102 in the present invention is of a different configuration. This change in configuration, combined with the absence of a skirt upon the lower perimeter of the piston 64 in the present invention, changes the configuration and nature of the implosion region 104, as will be described herein.

As part of the present invention, the inventors have determined that it is desirable to expand the implosion region, in order to provide greater fluid support for the implosions taking place within the working fluid. This greater fluid support reduces the evaporation of working fluid in the implosion region. The inventors have also determined that it is desirable to manipulate the configurations of the surrounding metal surfaces of the orifice disc 86, the rebound land 102 and the proximate interior surface of the pressure cylinder 62 near the implosion region 104, so that the implosions taking place within the working fluid do not take place near these metal structures. Thus, the noise and vibration generated by the implosions are minimized in their transmission throughout the vibration damper 60.

The minimizing of this generated noise and vibration is accomplished by the removal of the skirt 18 from the previous design and a sharpening of the angle or slope of the rebound land 102 in the improved design. As part of the present invention, the rebound land 102 has been configured at an angle or slope of approximately 80° in a radially outward and axially outward direction relative to the surface of the orifice disc 86 in an undeflected condition. The flow of working fluid exiting this valve structure into the working space 74 is therefore in a substantially outward radial direction, due to the configuration of the adjacent lower surface of the piston 64, including the rebound land 102, the orifice disc 86 and the valve discs 90. It will be appreciated that in other valve configurations, different directions of working fluid flow exiting the valve structure will occur. These changes result in an increased working fluid volume within the implosion region 104, which in turn allow less implosions within the working fluid to occur near metal surfaces forming the surfaces of the piston and valve structures. Thus, noise and vibration generated by the implosions may be suppressed by the increased fluid support resulting from the now-enlarged fluid volume of the implosion region 104.

During compression operation of the vibration damper 60, the piston 64, the support piston 66 and the piston rod 70 all move in a downward direction within the pressure cylinder 62. This causes an increase in pressure within the working fluid located within the working space 74 and an accompanying decrease in pressure within the working fluid located within the working space 72. As a result of this pressure differential, the working fluid flows from within the working space 74 through the piston bores 76, partially through the aperture 80 of the intake valve disc 78 and partially around the intake valve disc 78, and into the working space 72. The increased pressure within the working space 74 operates to deflect the intake spring 82, thereby allowing the passage of the working fluid through the intake valve disc 78, in similar manner as before.

During tension operation of the vibration damper 60, the piston 64, the support piston 66 and the piston rod 70 move in an upward direction within the pressure cylinder 62. This movement causes a pressure increase within the working space 72 and a pressure decrease within the working space 74. This pressure differential causes the working fluid from the working space 72 to flow through the aperture 80 and the piston bores 77, through the orifices 88 in the orifice disc 86, and past the rebound land 102 into the working space 74. Upon arriving in the region of the working space 74 adjacent the rebound land 102, the working fluid passing through the orifice disc 86 experiences the significant pressure drop, followed by a pressure increase as described above. This again causes the formation of vapor bubbles within the working fluid which subsequently collapse in the region labelled in FIGS. 2 and 3 as the implosion region 104. However, the change in configuration of the rebound land 102 to an 80° slope provides additional room for a circular flow to form in a direction away from the rebound land 102, as shown in the flow lines at 106. This fluid flow, combined with the fluid flow occurring from the surface of the valve discs 90, shown at 108, causes the implosion region 104 to be located further away from the surfaces of the rebound land 102 and the valve discs 90 than has occurred with the known design of FIG. 1. Also, the absence of the skirt 18 from the known design of FIG. 1 also causes the inward, or lower, surface of the piston 64 to extend radially outwardly and axially outwardly from the rebound land 102. Thus, the nearest metal structure in a radially outward direction from the rebound land 102 is the interior wall of the pressure cylinder 62 itself. The interior wall of the pressure cylinder 62 is still a sufficient distance from the main portion of the implosion region 104, such that most of the implosions within the working fluid do not occur close to the metal surfaces of the pressure cylinder 62, the piston 64 or the valve discs 90. Thus, there is increased working fluid support in the implosion region 104 for reducing the amount of vaporization within the working fluid, and for reducing the transmission of any noise and vibration that does occur through the vibration damper 60.

While the above detailed description describes the preferred embodiment of the present invention, it should be understood that the present invention is susceptible to modification, variation and alteration without deviating from the scope and fair meaning of the subjoined claims.

What is claimed is:

1. A hydraulic vibration damper comprising:
   a pressure cylinder having a longitudinal axis and a first end and a second end defining a working cavity therein, said working cavity operable for containing a working fluid;
   a piston rod disposed upon said longitudinal axis of said pressure cylinder and being moveable upon said longitudinal axis in an inward and an outward direction;
   a piston member disposed upon said piston rod within said working cavity, said piston member operable for dividing said working cavity between a first working space disposed adjacent one of said ends of said pressure cylinder and a second working space disposed adjacent the other of said ends of said pressure cylinder, said piston member operable for moving in an axial inward and an axial outward direction, said piston member including first passage means operable for allowing the passage of working fluid from said first working space to said second working space;
   first valve means disposed in fluid communication with said first passage means, operable to control the passage of working fluid from said first working space to said second working space in response to outward movement of said piston member, and operable to redirect working fluid flow in a first exit direction into said second working space, said first exit direction being toward an implosion region within said working fluid;
   wherein said piston member includes a rebound land surface configured relative to said first valve means to allow a region of working fluid between said implosion region and said rebound land surface;
   wherein said piston member is also configured radially outwardly relative to said first valve means to allow a region of working fluid between said implosion region and said pressure cylinder; and
   wherein at least one of said piston member configuration and said rebound land configuration are operable to reduce noise and vibration associated with implosions within the implosion region of said working fluid.

2. The hydraulic vibration damper according to claim 1, wherein said rebound land surface is sloped to extend radially outwardly and axially upwardly relative to said first valve means.

3. The hydraulic vibration damper according to claim 1, wherein said rebound land surface is configured relative to said first valve means to permit said working fluid exiting said first valve means to form a circular flow pattern adjacent said rebound land surface.

4. The hydraulic vibration damper according to claim 1, wherein said rebound land surface is sloped in an outward axial direction at an angle relative to said first valve means of about 80°.

5. The hydraulic vibration damper according to claim 1, wherein said piston member is configured to extend axially outwardly relative to said rebound land surface.

6. The hydraulic vibration damper according to claim 1, wherein said first valve means comprises an annular disc member having at least one orifice for allowing the passage of working fluid through said first passage means, said annular disc member disposed to substantially restrict fluid flow from said first working space to said second working space when said piston is substantially stationary or moving in an inward direction, said annular disc member operable to allow the passage of working fluid through said first passage means in response to increased pressure within said first working space.

7. The hydraulic vibration damper according to claim 1, wherein said first valve means further comprises spring means for urging the annular disc member in an axial direction toward said first passage means, thereby substantially closing said first passage means.

8. The hydraulic vibration damper according to claim 6, wherein said first valve means further comprises at least one disc member disposed between said annular disc member and said spring means, each disc member operable for being deflected in response to increased pressure within the first working space for allowing working fluid to pass from said first working space to said second working space.

9. The hydraulic vibration damper according to claim 1, further comprising:
   a support piston disposed upon said piston rod; and
   a piston bearing disposed upon said support piston and operable to substantially perform a seal between said support piston and said pressure tube.

10. The hydraulic vibration damper according to claim 1, wherein said piston member further includes second passage means operable for allowing the passage of working fluid from said second working space to said first working space.

11. The hydraulic vibration damper according to claim 10, further comprising second valve means disposed in fluid communication with said second passage means, said second valve means operable to control the passage of working fluid from said second working space to said first working space in response to inward movement of said piston member.

12. A hydraulic vibration damper comprising:
    a pressure cylinder having a longitudinal axis and a first end and a second end defining a working cavity therein, said working cavity operable for containing a working fluid;
    a piston rod disposed upon said longitudinal axis of said pressure cylinder and being moveable upon said longitudinal axis in an inward and an outward direction;
    a piston member disposed upon said piston rod within said working cavity, said piston member operable for dividing said working cavity between a first working space disposed adjacent one of said ends of said pressure cylinder and a second working space disposed adjacent the other of said ends of said pressure cylinder, said piston member operable for moving in an axial inward and an axial outward direction, said piston member including first passage means operable for allowing the passage of working fluid from said first working space to said second working space;

first valve means disposed in fluid communication with said first passage means, operable to control the passage of working fluid from said first working space to said second working space in response to outward movement of said piston member, and operable to direct working fluid flow in a first exit direction into said second working space, said first exit direction being toward an implosion region within said working fluid;

wherein said piston member includes a rebound land surface sloped to extend radially outwardly and axially upwardly relative to said first valve means at an angle of about 800 to allow a region of working fluid between said implosion region and said rebound land surface and to permit said working fluid exiting said first valve means to form a circular flow pattern adjacent said rebound land surface;

wherein said piston member is configured radially outwardly and axially outwardly relative to said first valve means to allow a region of working fluid between said implosion region and said pressure cylinder; and wherein at least one of said piston member configuration and said rebound land configuration are operable to reduce noise and vibration associated with implosions within the implosion region of said working fluid.

* * * * *

UNITED STATES PATENT AND TRADEMARK OFFICE
CERTIFICATE OF CORRECTION

PATENT NO. : 5,755,305

DATED : May 26, 1998

INVENTOR(S) : Stefan Deferme et al

It is certified that error appears in the above-identified patent and that said Letters Patent is hereby corrected as shown below:

Col. 1, line 54, delete "an" and substitute --a-- therefor

Col. 3, line 30, delete "futures" and substitute --features-- therefor

Col. 5, line 34, delete "an" and substitute --a-- therefor

Col. 7, line 59, after "condition" insert a comma

Col. 12, line 4, "800" should be -- 80° --

Signed and Sealed this

Tenth Day of November 1998

Attest:

BRUCE LEHMAN

*Attesting Officer*     *Commissioner of Patents and Trademarks*